2,565,475

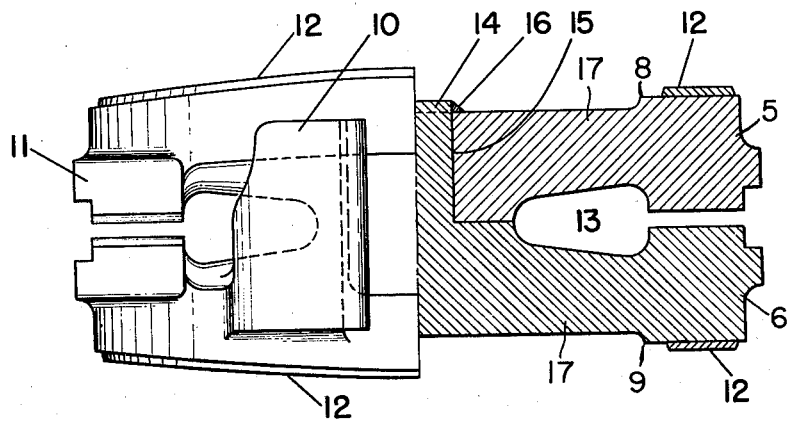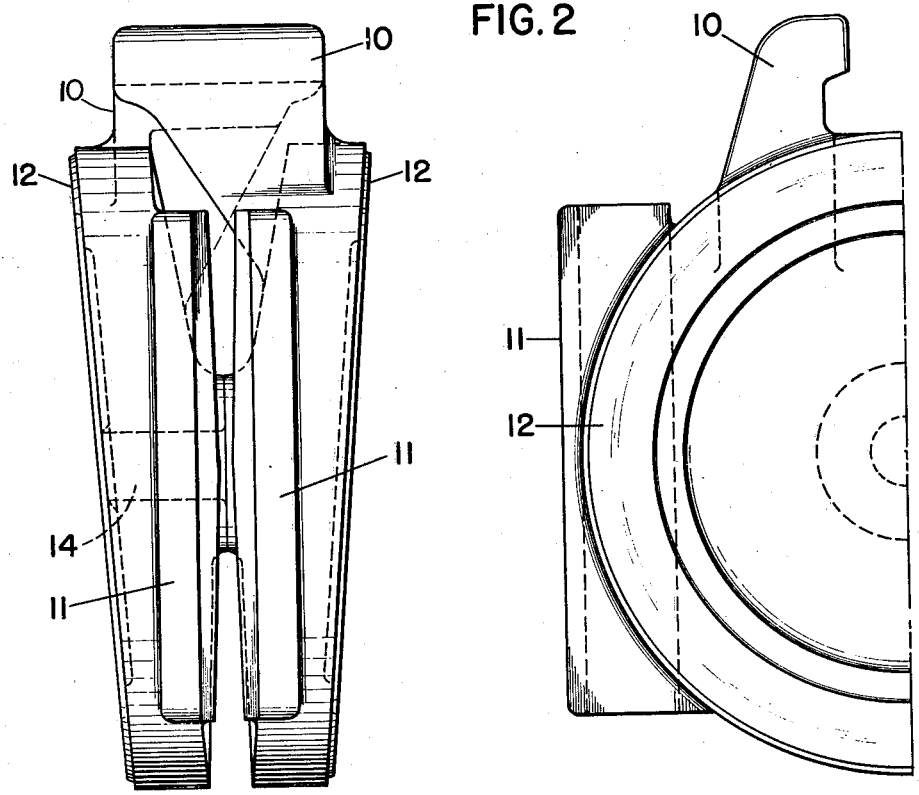
Aug. 28, 1951 — L. COX — 2,565,475
GATE VALVE
Filed April 10, 1946 — 2 Sheets-Sheet 1
FIG. 2
FIG. 4
FIG. 1
Inventor
LUM COX Inventor
LUM COX Patented Aug. 28, 1951

UNITED STATES PATENT OFFICE 2,565,475

GATE VALVE

Lum Cox, United States Navy

Application April 10, 1946, Serial No. 661,043

1 Claim. (Cl. 251—159)

(Granted under the act of March 3, 1883, as amended April 30, 1928; 370 O. G. 757)

This invention relates to steel gate valves and in particular to a valve composed of two disc-like members which interfit with each other and are welded together.

One object of the invention is to provide a gate valve of truncated wedge cross-section which is adapted to compensate for the expansion stresses set up in the valve under conditions of high temperature and pressure. Another object of the invention is to provide a gate valve in which the valve seats in the casing and the cooperating portions on the gate are composed of a wear resisting metallic alloy, or are, at least, surfaced with such an alloy. An additional object is to provide a valve which is easily operable under conditions of high temperature and high pressure. A further object is to provide a valve which is of strong and durable construction efficient in operation and economical to construct and maintain.

It is known in the art to provide gate valves in which the valve is a solid member either of wedge-like cross-section or composed of two members as in the case of the applicant, but in general the type composed of two members is one in which they are movable or rotatable with respect to each other and are held in closure against the valve seat by a toggle mechanism, cams, wedges, springs or the like. In general this construction is inefficient under conditions of high temperature and pressure and in the case of the solid valve binds against the valve seat to such a degree as to be inoperable. Mechanical closure for two member valves is deficient, in that fatigue and wear soon renders the mechanism ineffective for efficient closing.

In order to have a clear conception of one embodiment of the invention reference is now made to the drawings in which:

Figure 1 is a front elevation of the valve.

Figure 2 is a top plan and sectional view which is partly in elevation and partly in section.

Figure 4 is an end view of Figure 1 in elevation showing the assembled members which constitute the valve.

Figure 3:
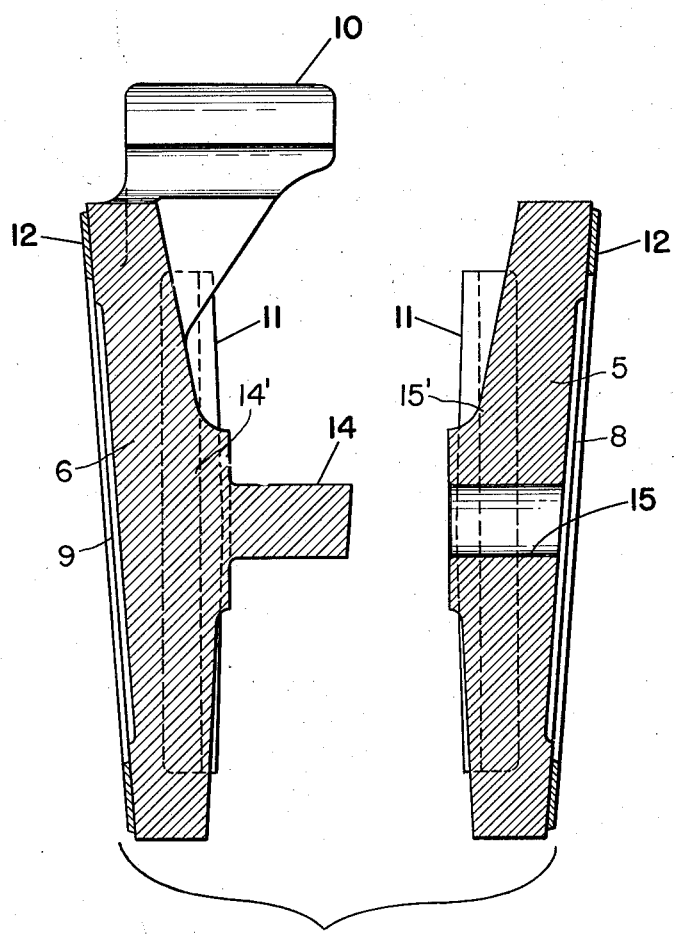
Figure 3 is a sectional view of the valve members spaced from each other. It is partly in elevation and partly in section.

The gate valve comprises a pair of disc members 5 and 6 having outer faces 8 and 9 respectively. Each disc member has an integral lug 10 by which the completed valve gate is connected to the valve stem (not shown) in the conventional manner. 11 represents an integral guide follower on the outer edge of each disc member; and 12 represents an outer annular seat-facing of wear resisting alloy on each face 8 and 9 of the disc members for cooperation with the valve seat in the casing.

In Figure 2, 13 represents the annular space which is provided between the disc members and which is radially of irregular contour. The disc member 6 has an integral stud 14 that extends perpendicularly away from the inner face of a central hub portion 14' of the body of the disc member. The disc member 5 is provided with a central opening 15 that extends through a hub portion 15' of the disc member. The inner hub and the outer valve seat annulus of each member are separated by a web 17 of a thickness which is less than that of the hub or the annulus.

When the two disc members 5 and 6 are assembled, the stud 14 fits into the opening 15, passing therethrough to the face 8 of the disc member 5 where the stud-end can be easily welded to the hub 15', as indicated at 16, thereby forming a valve unit in which the mass distribution in each member is uniform. In the assembled gate valve the inner faces of the hub portions 14' and 15' are flush against each other, as shown in Figs. 2 and 4.

In operation this valve, because of its design and construction, operates very easily. This is due to the provision of the annular space between the two members. Under conditions of high temperature and pressure, the conventional solid valve binds against the valve seat to such an extent that, in most cases, it can only be moved to open position by the application of powerful wrenches to the valve stem. This has a very deleterious effect on the valve stem and reduces the life of the valve. In operation, the present invention overcomes the jamming tendency of thermal expansion of the valve by distributing the heat uniformly in the members and by absorbing a part of the expansion in the annular space provided between the two members. This valve has been found to operate easily under conditions of high temperature and pressure, and also after a considerable period of stand-by.

While the particular embodiment of valve herein disclosed and described is that of two approximately cylindrical, rigidly connected discs provided with an annular space of a particular configuration, it is not desired to be limited thereto as it is obvious to one familiar with the art that the valve members could be shaped otherwise than approximately cylindrical and the configuration of the annular space could be other than that shown without departing from the spirit or scope of the invention.

The invention described herein may be made and used by or for the Government of the United States for governmental purposes without the payment to me of any royalties thereon or therefor.

What I claim is:

A gate valve asembly adapted to be easily operable under conditions of high temperature and pressure, comprising a pair of disc-like members; a first of said members comprising a body portion having an outer face and comprising an integral central hub portion having an integral stud extending in a direction substantially perpendicular to said face, said outer face having an annular portion providing a wear-resistant seating portion; the second of said members comprising a body portion having an outer face and comprising an integral hub portion having a central opening therethrough, the last said outer face having an annular wear-resistant seating portion; said outer faces facing in generally opposite directions; said integral stud being mounted in said opening and being of a length extending to the second mentioned outer face for welding; a weld joint at said second outer face joining said stud and said second member; said members being flush at their hub portions; portions of said members extending outwardly from said hub portions, said extending portions being thinner than said hub portions and forming an outer annular expansion space between said members.

LUM COX.

REFERENCES CITED

The following references are of record in the file of this patent:

UNITED STATES PATENTS

| Number | Name | Date |
| --- | --- | --- |
| 236,780 | Coffin | Jan. 18, 1881 |
| 734,351 | McKeown | July 21, 1903 |
| 838,842 | Castle | Dec. 18, 1906 |
| 1,552,614 | Kiley | Sept. 8, 1925 |
| 2,075,123 | Lunken | Mar. 30, 1937 |
| 2,193,922 | Hehemann | Mar. 19, 1940 |
| 2,195,923 | Hehemann | Apr. 2, 1940 |
| 2,237,776 | Benoit | Apr. 8, 1941 |
| 2,359,442 | Sandilands | Oct. 3, 1944 |

FOREIGN PATENTS

| Number | Country | Date |
| --- | --- | --- |
| 4,586 | Great Britain | of 1881 |